April 25, 1933.　　　C. O. JOHNSON　　　1,905,904
TRUCK MAINTAINER
Filed June 3, 1932　　　4 Sheets-Sheet 3

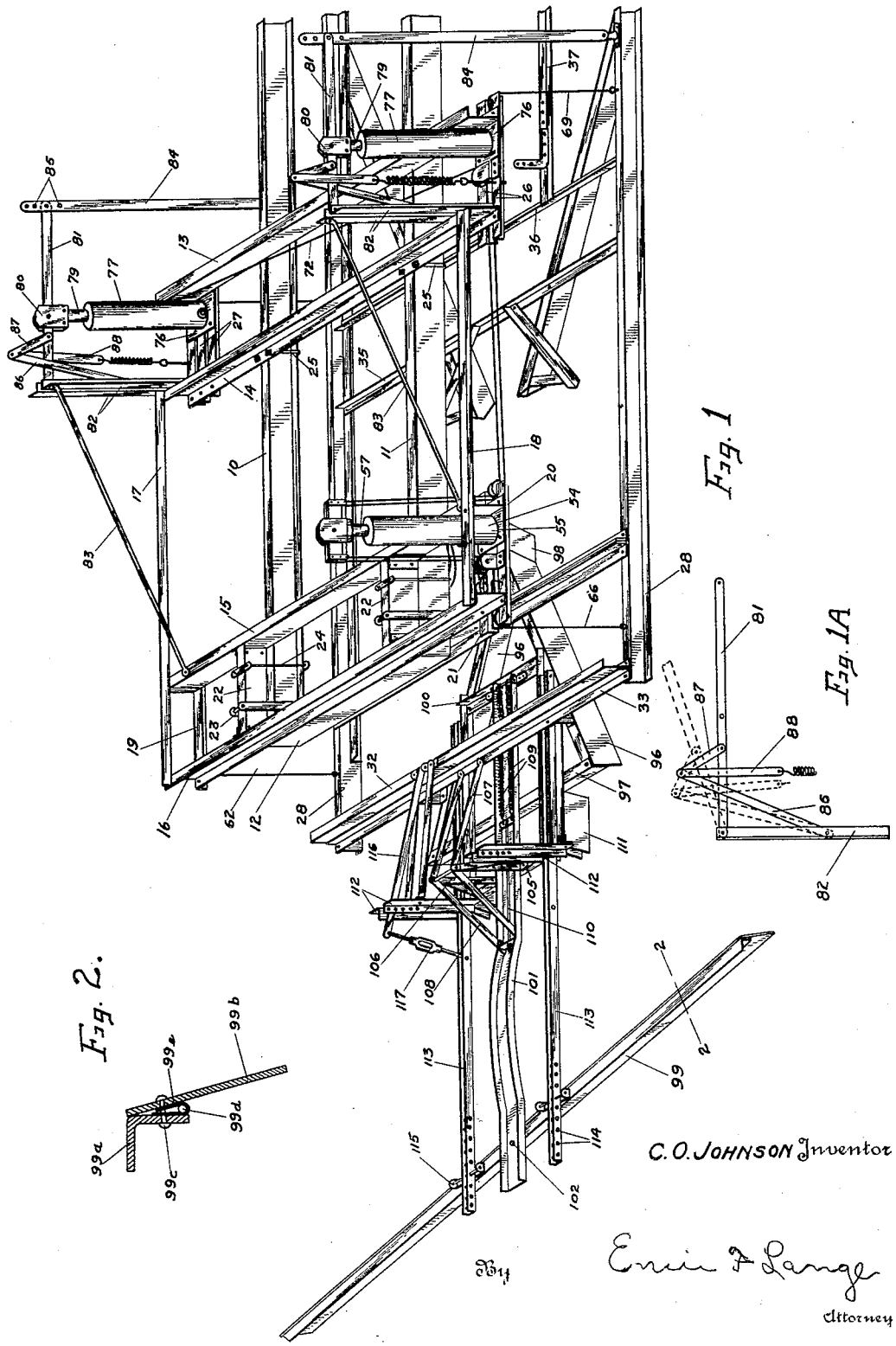

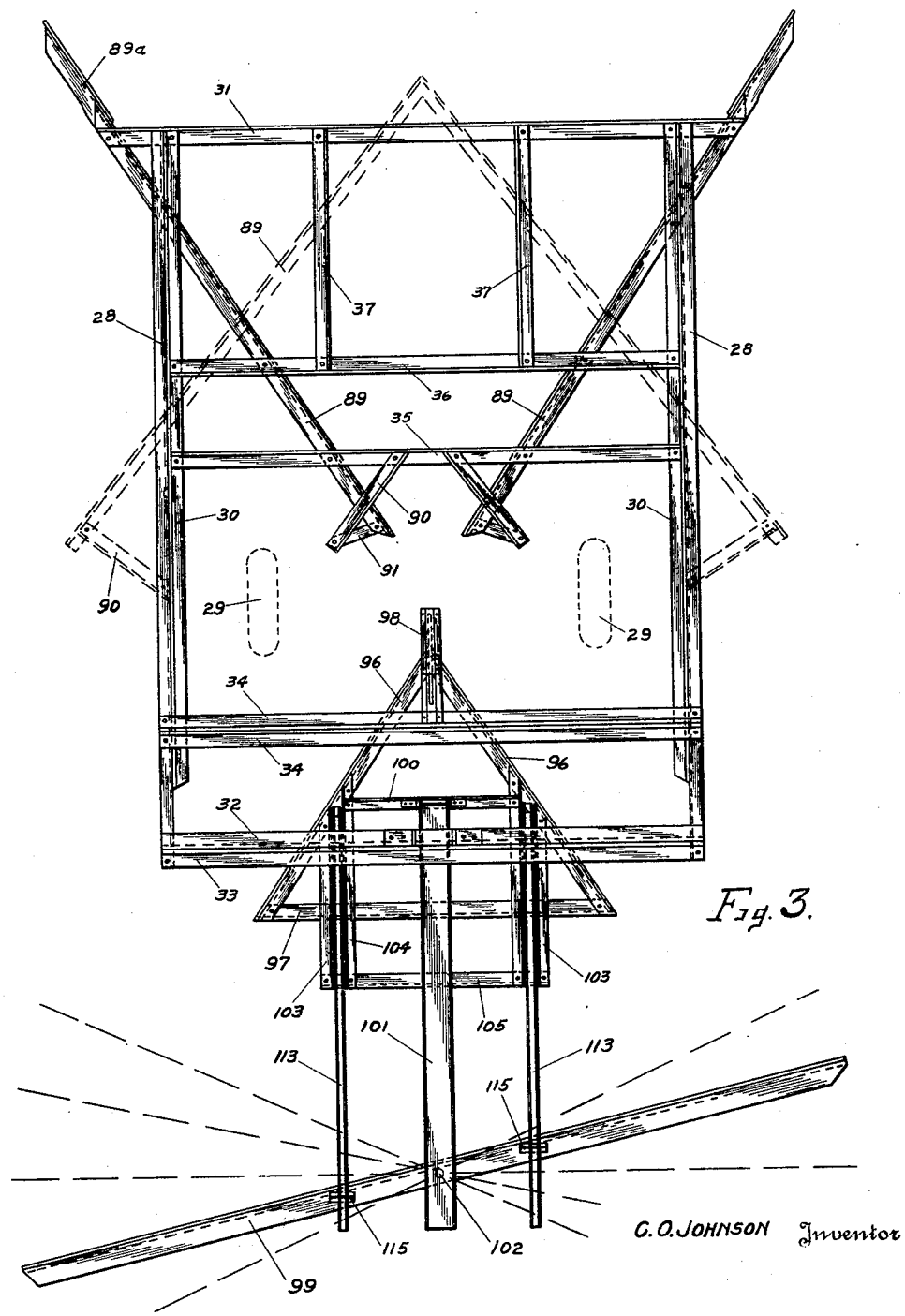

C. O. JOHNSON Inventor

April 25, 1933.    C. O. JOHNSON    1,905,904
TRUCK MAINTAINER
Filed June 3, 1932    4 Sheets-Sheet 4
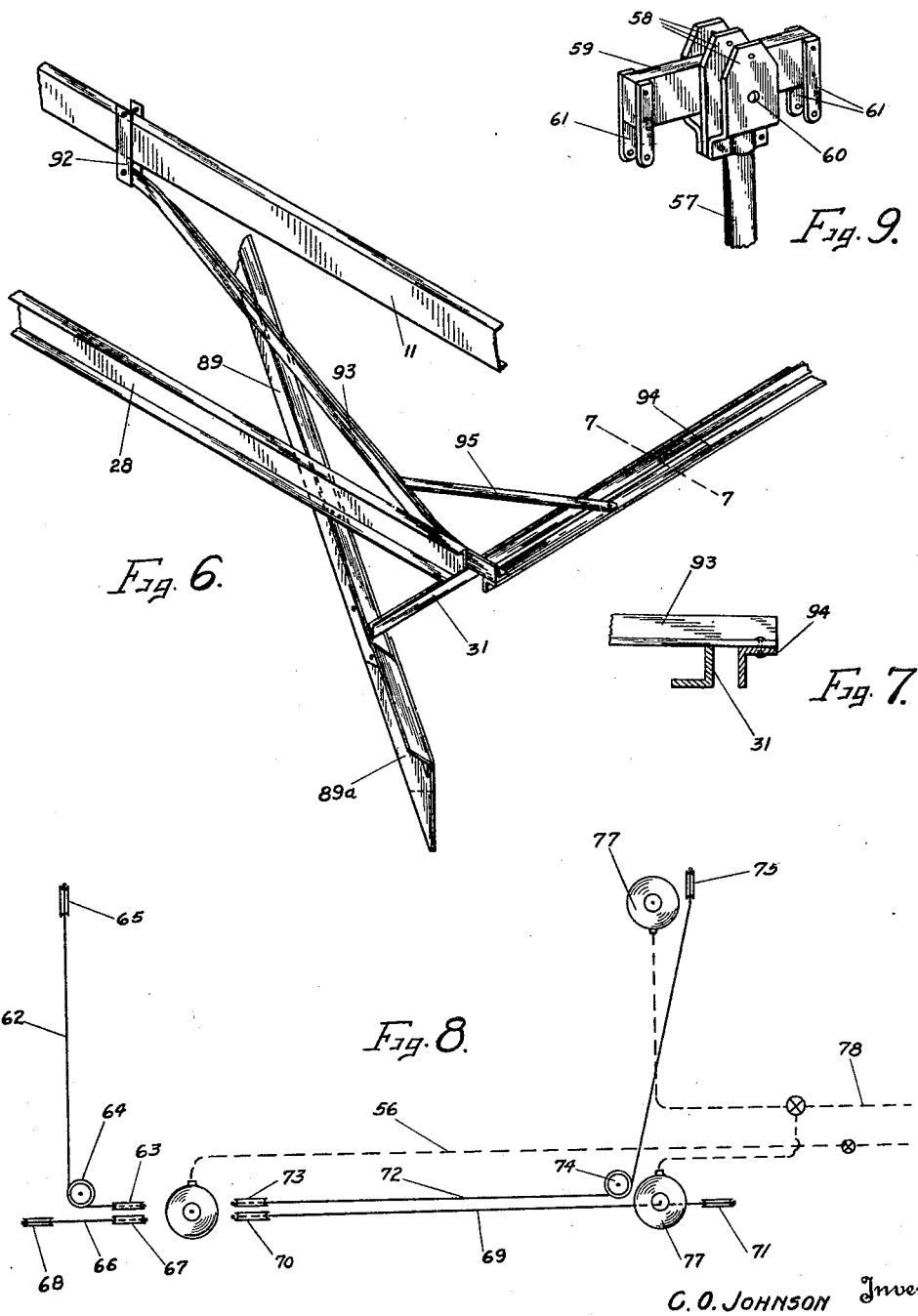

Patented Apr. 25, 1933

1,905,904

UNITED STATES PATENT OFFICE

CARL O. JOHNSON, OF LINCOLN, NEBRASKA

TRUCK MAINTAINER

Application filed June 3, 1932. Serial No. 615,151.

My invention relates to implements for maintaining the surfaces of highways, the primary object of the invention being the provision of a maintainer which is adapted to be supported and to be drawn by a truck at normal truck speeds.

Another object of the invention is the provision of a supporting frame which may be releasably secured to a truck frame without drilling holes in the truck frame or otherwise marring or weakening the truck frame, the supporting frame being designed for supporting a scraper frame.

Another of my objects is the provision of a scraper frame having a floating relation with a truck frame so that it readily adapts itself to the various road surfaces.

Another object which I have in view is the provision of a rearwardly converging pair of scrapers which are adjustable either into parallel relation or into a rearwardly diverging relation for use in removing snow from highways.

Another of my objects is the provision of a pair of rearwardly converging scrapers associated with a pair of rearwardly diverging scrapers positioned in the rear of the rearwardly converging scrapers, whereby side draft is eliminated.
Another of my objects is the provision of a pair of rearwardly diverging scrapers having runners for resisting the side thrusts due to irregularities in the road surface.

Still another object of the invention is the provision of a rear transporting scraper in combination with a plurality of scrapers in the forward portion of a road maintaining implement, the rear transporting scraper being adjustable in a horizontal plane to various inclinations with respect to the line of draft and being adapted to transport loosened soil toward one side or the other of the road and to thus fill all ruts and depressions in the road.

Another object which I have in view is the provision of a transporting scraper at the rear of a road maintaining implement, the securing means for the transporting scraper having a novel form of adjustable device for maintaining a pressure on the transporting scraper.

Another of my objects is the provision of a plurality of hydraulic jacks supported by the truck for hoisting or lowering the scraper frame or for adjustably varying the inclination of the scraper frame to the road surface.

It is also my object to provide jacks for the forward corners of the implement, the jacks being of a novel form and having a dead-center spring connection for assisting in the lifting operation.

Having in view these objects and others which will be pointed out in the following description, I will now refer to the drawings, in which Figure 1 is a view in perspective of the maintainer, only a portion of the truck platform being shown and certain parts of the maintainer being omitted.

Figure 1A is a diagrammatic view in side elevation showing the action of the linkage actuated by the front jacks.

Figure 2 is a view in cross section of the rear scraper on an enlarged scale on the line 2—2 of Figure 1.

Figure 3 is a plan view of the scraper frame of the maintainer and showing particularly the various angles of the scraping blades.

Figure 6 is a view in perspective of a portion of one of the forward scraper blades and showing also a yielding connection between the truck frame and the forward end of the scraper frame.

Figure 7 is a sectional view on the line 7—7 of Figure 6.

Figure 8 is a diagram of the lifting cable arrangement and of the hydraulic jack connections.

Figure 9 is an illustration of the head of the piston for the rear jack.

Figure 4:
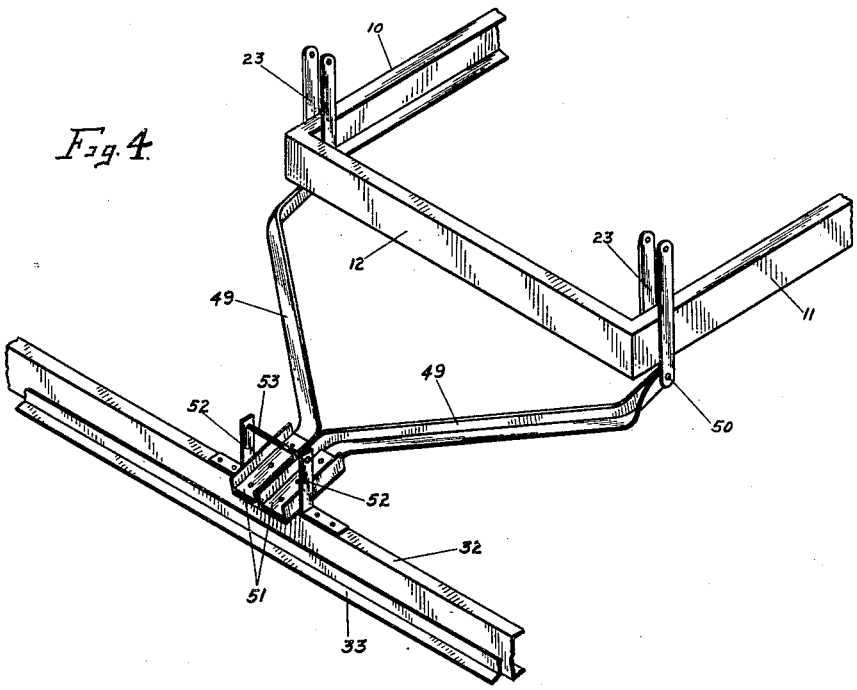
Figure 4 is a view in perspective of a floating and yielding connection between the rear end of the truck frame and the scraper frame.

The maintainer is supported and propelled by a truck which is not shown in the drawings but which has two rearwardly extending beams 10 and 11 connected at their rear extremities by a beam 12. The truck cabin is, of course, at the forward end of the truck while the platform at the rear of the cabin is stripped entirely to leave the beams 10, 11 and 12 exposed for the application of the maintainer.

The maintainer includes two frames which I shall designate as the supporting frame and the scraper frame. The supporting frame rests on the beams 10, 11 and 12 while the scraper frame is suspended beneath the truck frame from the supporting frame.

The supporting frame includes four transverse beams 13, 14, 15 and 16, all preferably made from channel steel. The beams 13 and 14 constitute the forward pair while the beams 15 and 16 constitute the rearward pair. In each pair the beams are so positioned that the channels are directed outwardly. All four beams are secured together at one side by means of an angle iron strap 17 passing over their upper edges. At the other side the beams 14, 15 and 16 are connected to each other by means of an angle iron strap 18. A short length of angle iron in the form of a strap 19 connects the transverse beams 15 and 16 at their lower edges at one of their ends. Likewise the angle iron strap 20 similarly connects the beams 15 and 16 at the opposite end but the strap 20 cooperates with a similar strap 21 which is spaced from the strap 20 for reasons to be subsequently explained. The beams 15 and 16 are further braced and reinforced by means of two channel steel braces 22. These braces 22 are firmly secured to the beams 15 and 16 and they are positioned to rest directly on the truck beams 10 and 11 to which they are releasably secured by means of the clamps 23 and 24. The clamps 23 are designed to take care of the side thrust while the clamps 24 take up the end thrust. Further attachment of the supporting frame to the truck frame includes the use of U-bolts 25 embracing the beams 10 and 11 and secured in the lower horizontal web of the beam 14.

The channel beams 13 and 14 are connected to each other at one end by means of angle steel straps 26 and at the other end by means of angle steel straps 27. In each case the straps are spaced from each other and their upper edges lie in a common plane.

The scraper frame includes two side beams 28 which are positioned at some distance beyond the sides of the truck frame and in the rear of the truck frame. The relative position of the beams 28 and the beams 10 and 11 of the truck is shown in Figure 1 while the position of the rear truck wheels in their relation to the beams 28 is shown in dotted lines at 29 in Figure 3. The channel steel beams 28 are reinforced throughout the major portion of their length by means of angle steel beams 30 as best shown in Figure 3. The beams 28 are connected at their forward extremities by a beam 31 which projects to a slight distance beyond the beams 28, the beam 31 being also secured to the reinforcing beams 30. At their rear extremities the beams 28 are connected by means of a channel beam 32 which is reinforced by means of an angle beam 33 which is also secured to the beams 28. The transverse angle beams 34 are also secured at their extremities to the beams 28. Angle beams 35 and 36 connect the reinforcing beams 30. The transverse beams 31 and 36 are further connected by a pair of longitudinal angle steel beams 37 of short length. The purpose of this frame arrangement is not only to provide a rugged and unyielding frame but also to provide supports positioned conveniently for attaching the scrapers.

Figure 5:
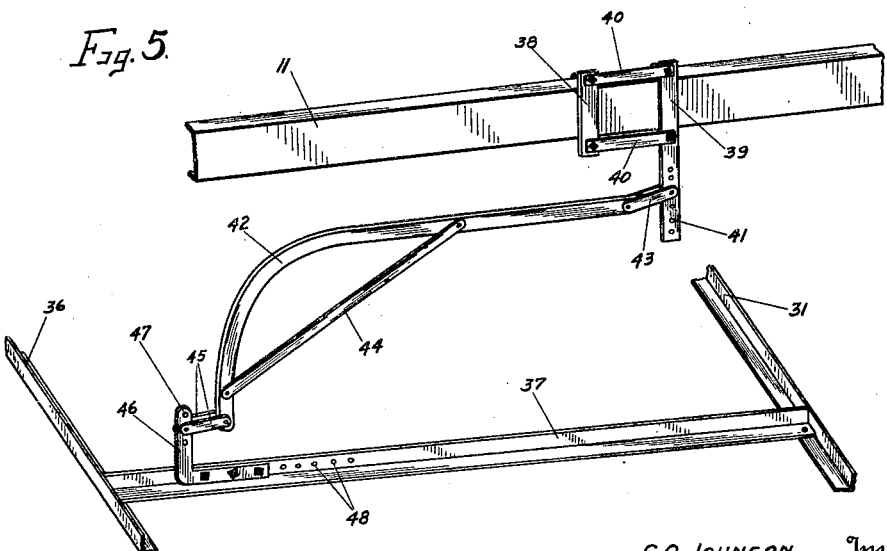
Figure 5 is a perspective view of the gooseneck and the flexible draft connection for the front of the scraper frame.

The draft arrangement between the truck frame and the scraper frame is shown in Figures 4 and 5. The forward draft device includes a clamp which is rigidly secured to the side beam 11 of the truck frame. This clamp consists of bars 38 and 39 which are rigidly clamped to the beam 11 by means of U-bolts. The bars are connected to each other by means of a pair of links 40, the U-bolts passing through the links as well as through the bars. The link 39 extends to some distance below the beam 11 and it is provided with a plurality of apertures 41 for draft adjusting purposes. The gooseneck 42 is connected with the bar 39 by means of a pair of links 43 which are pivotally connected to the gooseneck 42 and to the bar 39 through one of the apertures 41. The gooseneck 42 is provided with a rigid brace 44. At the rear extremity of the gooseneck another pair of links 45 connects the gooseneck with an L-shaped bracket 46 which in turn is connected to one of the beams 37 of the scraper frame. The bracket 46 is also provided with a plurality of apertures 47 and the beam 37 is provided with apertures 48. The draft on the scraper frame is, of course, forward, but due to the arrangement just described, a distinct downward thrust is exerted on the forward portion of the scraper frame. Both the draft and the downward thrust may be adjusted by adjustment of the links 43 on the bar 39 or by the adjustment of the links 45 on the bracket 46 or by the adjustment of the bracket 46 on the beam 37. Any two or all three of these adjustments may be made to provide the desired relation between the forward draft and the downward thrust.

The clamps 23, which have already been described, embrace the beams 10 and 11. The arms 49 are pivotally connected at their forward extremities at 50 to the clamping links 23 as shown in Figure 4. These forked arms terminate at their rear ends in parallel portions so that the fork is in the form of a Y. The parallel rear end portions of the fork arms are secured to short lengths of channel steel as shown at 51. The beam 32 of the scraper frame is provided in its middle portion with two parallel upstanding brackets 52 and the parallel rear ends of the fork arms rest between the brackets 52 as shown in Figure 4. The brackets are connected at their upper extremities by means of a rod 53 to not only brace the brackets but to limit the jumping movements of the rear end portions of the fork arms.

It will thus be seen that both the front and the rear end portions of the scraper frame have very flexible connections with the truck frame. The work which the maintainer is called upon to do is very rough and the surfaces over which the scraper travels are sometimes very uneven. There must be great flexibility in the connections in order to prevent undue wear and tear on the scraper and on the truck. The connections are, however, designed not only for taking up the impacts on the road but they are also designed for providing great flexibility and adjustment. In going to and from the work, the scrapers and their frames are elevated into inoperative position. While at work the scrapers and the frames must be adjusted to properly distribute the weight of the scrapers on the particular road on which the work is being done. The forward and rear connections as shown in Figures 4 and 5 are sufficiently flexible to permit the parallel elevation of the scraper into inoperative position or to so adjust the scraper frame that it will tilt at any desired degree and in any desired direction.

The scraper frame is suspended through cables from the supporting frame, there being cable connections at or near all four corners of the scraper frame. Due to the very heavy weight of the scraper frame, I employ hydraulic jacks for elevating, lowering and adjusting the scraper frame. As shown in Figure 1, a vertical cylinder 54 is supported on the beams 20 and 21, a supporting plate 55 being secured to the beams underneath the cylinder 54. This cylinder is connected through a pressure line 56 with a pressure pump in the cab of the truck, the pressure line 56 being shown diagrammatically in Figure 8. The cylinder 54 is provided with a piston 57 having a head which is best shown in Figure 9. The head includes three vertically disposed spaced plates 58 providing two spaces for the reception of levers 59, only one of which is shown in Figure 9. The levers 59 are pivotally connected to the plates by means of a pin passing through the apertures 60 of the plates. The levers 59 are provided with depending hangers 61 for securing cables thereto. Two levers 59 are employed and these therefore carry four cables passing to the four corners of the scraper frame as shown diagrammatically in Figure 8. The cable 62 passes downwardly from a hanger 61, underneath a pulley 63, horizontally around a pulley 64, over a pulley 65 and then downwardly to its connection with the beam 28 as shown in Figure 1. The cable 66 passes underneath the pulley 67, then rearwardly and over the pulley 68 and then downwardly to its connections with the beam 28 as shown in Figure 1. The cable 69 passes underneath the pulley 70, then forwardly and over the pulley 71 and finally downwardly to its connection with the beam 28 as shown in Figure 1. The cable 72 passes over the pulley 73, then forwardly and around the pulley 74, then laterally and over the pulley 75, and finally downwardly to its connection with the beam 28 which can not be clearly shown in Figure 1 due to the fact that it is obscured by other parts. When pressure is conducted through the pressure line 56, the piston 57 will be elevated carrying with it the hangers 61 and applying simultaneously tension to all of the cables. In this manner the entire scraper frame is lifted, the scraper frame being maintained in substantially horizontal position due to the fact that the levers 59 will rock sufficiently to take up any normal inequalities in tension in the various cables.

Provision is also made for raising and lowering the scraper frame at the forward corners. The pairs of beams 26 and 27 each serve as platforms, the platforms being completed by the addition of steel plates 76 which are riveted or otherwise secured to the beams. The platforms 76 each support a cylinder 77 similar to the cylinder 54. These cylinders are connected with a pressure line 78 as shown in Figures 8, the pressure line being provided with a valve for directing the pressure into either of the cylinders 77. The pistons 79 have forked heads 80 supporting levers 81. Two spaced standards 82 rise from the platforms in the rear of each cylinder 77 and are secured to the beam 14. These standards are braced to the supporting frame by means of braces 83. The levers 81 are pivotally connected at their rear extremities to the standards 82. At the forward ends of the beams 28 there are standards 84, these standards being pivotally secured at their lower extremities to the beams 28. The upper end portions of the standards 84 are each provided with a plurality of apertures 85 to provide means for pivotal attachment of the levers 81 at their forward extremities. The apertures 85 provide an adjustment between the levers 81 and the standards 84 to control the lifting movement of the forward end portions of the scraper frame. Each of the two corner lifting devices further includes a link 86 pivotally secured between standards 82, a second link 87 pivotally secured to the link 86 and to the lever 81 and a flexible and resilient connection 88 between the pivot of the links 86 and 87 and the beams 26 or 27.

When it is desired to raise one of the forward corners of the scraper frame, pressure is delivered through the pressure line 78 to one or the other of the cylinders 77 depending on the corner which it is desired to lift. The pressure will immediately force up the piston 79 and this upward movement of the piston will be communicated through the head 80 to the lever 81. The position of the rear end of the lever 81 is fixed so that the movement of the lever 81 will take place about its rear extremity. This then exerts an upward force through the front extremity of the lever 81 on the standard 84 and it carries upwardly the corner of the scraper frame to which the standard 84 is secured. The spring connection 88 normally exerts a downward thrust and tends to hold the scraper against the surface of the soil. When the piston 79 moves upwardly to move the lever 81 about its pivot, the pivotal connection of the links 86 and 87 will move rearwardly. The tension of the spring thus increases until the pivotal point of the links 86 and 87 passes center. From then on the spring connection 88 will assist in the lifting of the arm 84, the spring being gradually relaxed during the latter part of the lifting movement. The scraper frame may likewise be lowered at its forward corners by discharging the pressure from the cylinders 77.

The scraper arrangement is best shown in the plan view in Figure 3. At the forward extremity of the scraper frame there are two scrapers 89 which diverge in a forward direction. Each of these scraper blades 89 is rigidly but releasably secured to the beams 31, 28, 36 and 35 as shown in Figure 3. In order to increase the rigidity of the connections, straps 90 cross the scrapers 89 to which they are secured and the straps are further secured to the beam 35. Other straps 91 connect the scrapers 89 to the straps 90 at the rear extremities thereof. It will thus be seen that an extremely rigid construction has been provided to withstand the strains put upon the scrapers and scraper frame in the rough usage to which they are subjected. This result is obtained not only by the rigid construction of the scrapers but also by means of the beam arrangement of the scraper frame to provide numerous points on the frame for securing the scrapers themselves.

In order to utilize the full power of the truck engine and in order to reduce the labor cost of the road work, the scraper should be of maximum width. While the truck and the scraper frame are narrow enough to pass through the garage doors which house the road working machinery, their width is such that any additional width would prevent the implement from passing through such doors. I overcome this difficulty by means of two extensions 89a for the scrapers 89. These extensions are readily removable by removing bolts but they add several inches to the width of the scraping implement and they are also easily removable so that the implement may pass through gates and doors. The ends of these scraper attachments 89a may be vertical but I prefer to bevel them as shown in dotted line in Figure 6. These scrapers very often pass over bridges where their sharp end corners might splinter the planking of the bridge but this may easily be overcome by cutting off the corners of the scrapers in the manner indicated in the dotted line of Figure 6.

In order to make the maintainer useful as a snow plow for use in removing snow from the highways, the scrapers 89 are adapted to be secured to the frame in the manner shown in dotted lines in Figure 3. In this manner they form a V with the apex entering the snow drift. When thus mounted the straps 90 are removed to their dotted line positions so as to brace the rear end portions of the scrapers.

With the scrapers 89 the rearward thrust is fairly evenly distributed so that there is no side draft. Irregularities in the road, however, result in a constantly changing side thrust in both directions. In order to resist these side thrusts without interfering with the flexibility of the scraper frame, I provide the structure shown in Figure 6. This shows only a small portion of the mechanism at the forward extremity but it shows a connection between the truck frame and the scraper frame which will resist side thrusts. The beam 28 of the scraper frame is below and a little to the outside of the beam 11 of the truck frame. The forward transverse beam 31 of the scraper frame is also shown. This beam, as shown in Figure 7, is made of angle steel. Secured to the truck beam 11 is a clip 92 embracing the truck beam 11. An arm 93 is pivotally connected at its rear end to the clip 92 and it is secured at its forward extremity to a transverse angle iron member 94. It is to be understood that this mechanism is duplicated at the opposite side of the truck frame with a clip similar to the clip 92 secured to the truck beam 10 and with an arm similar to the arm 93 secured to the opposite extremity of the angle iron member 94.

The angle iron member 94 has the relation to the beam 31 as shown in cross section in Figure 7. For strengthening purposes the arm 93 and the angle iron member 94 are braced as by means of a brace 95. Any side thrust will therefore be directed against one of the beams 28 of the scraper frame without interfering with the up and down movements of the scraper frame. When the scraper frame moves upwardly either under the action of the lifting mechanism or due to the irregularities in the road, the arms 93 take up this motion.

Again referring to Figure 3, with reference also to Figure 1, it will be seen that I have provided a V-shaped scraper at the rear of the scraper frame proper. This scraper includes two scrapers 96 which are rigidly secured to the beams 32, 33 and 34. The scrapers 96 with their blades converge forwardly so as to cut and divide the soil which is carried backwardly by the scrapers 89. The two scrapers 96 are connected by means of an angle iron brace 97 so that the scrapers with their brace are in substantially the form of an equilateral triangle. This rear scraper also has means for resisting side thrusts and side draft. At the apex of the angle formed by the scrapers 96, there is a runner 98 extending both forwardly and rearwardly from the apex.

The rear scraper 99 functions largely as a transporting scraper for carrying the loose road material toward one side or the other of the scraper. Since it is normally set at an inclination to the line of draft, it develops considerable side draft for which provision must be made especially since it is located so far in the rear of the truck and particularly of the truck motor. Secured to the scrapers 96 is a transverse brace 100. As shown in Figure 1, the brace 100 is rigidly secured to the scrapers 96 and it is in angular form with one portion projecting upwardly. It is provided with ears to which is pivotally secured a rearwardly extending arm 101. The arm 101 is in channeled form with a slight upward curvature in one portion as shown in Figure 1. The scraper 99 is pivotally secured at 102 to the arm 101. Longitudinally extending arms 103 and 104 are also secured to the scrapers 96 and to the rear transverse brace 97 as shown in Figure 3, these arms extending rearwardly from the brace 97. The arms 103 and 104 are connected at their rear extremities by means of a brace 105. Rising from the rear end portion of the frame and on opposite sides of the arm 101 are two standards 106. The two standards 106 are apertured as shown in Figure 1 and they are connected together at their upper extremities by means of a brace. Each arm is further braced at 107 to the beam 33. Pivotally secured to the arms 106 is a yoke or presser arm 108, the lower end of which rests in the channeled portion of the arm 101. Two coil springs 109 are connected through a screw threaded rod 110 to the free end of the yoke 108. The tension of the springs 109 is, of course, adjustable. The action of the springs is to pull forwardly on the yoke 108 and to therefore increase the downward thrust on the scraper 99. This becomes important for two reasons. The scraper and its frame do not have sufficient weight of themselves to act efficiently on the loose material of the road surface but the action of these springs supplements the weight. The scraper 99 in passing over the road which has become "chucky" will soon vibrate and chatter. The springs 109 will take up this chatter so that the action of the scraper 99 will be smooth. The depressions in the road are usually transverse with respect to the road so that the chatter is to some extent minimized by the fact that the scraper does not enter the depression all at once but rather rides over it from its forward to its rear end.

The side draft of a scraper 99 of the length here employed is very great and special provision must be made for resisting this side draft. The structure for thus resisting this side draft is best shown in Figure 1. The frame projecting rearwardly from the V-shaped scraper has two pairs of runners 111 parallel to the line of draft and so arranged that they exert a powerful influence in maintaining the travel of the rear parts of the scraper in parallelism with the direction of travel of the implement as a whole. Rising from the frame above these scrapers are pairs of standards 112 which are spaced for the reception of arms 113. These arms are pivotally secured at their forward extremities and they are maintained in parallelism with each other by being confined between standards 112. At their rear end portions they are each provided with a plurality of apertures 114. The scraper 99 has two U-shaped clips 115 secured thereto for receiving the arms 113. The apertures 114 receive pins passing through the ears of the clips 115 so that the scraper 99 may be set at any desired angle as shown in dotted lines in Figure 3. When it is desired to alter the inclination of the scraper 99, all that is necessary is to lift the arm 101, to then insert a pin through the apertures of the standards 106 beneath the arm 101 and to then remove the pins from the clips 115 leaving the scraper free to swing around its pivot 102.

A supplemental adjustment is also provided for varying the pressure on the scraper 99. The arm 116 is secured at its forward end to the beam 32 and it passes rearwardly between two standards 112 to which it is secured by means of a pin passing through the apertures of the standard. The rear extremity of the arm 116 is secured through a turn buckle 117 to an arm 113. This arm 113 may then be lifted or lowered, this being done chiefly for the purpose of properly adjusting the pressure at the two ends of the scraper 99. Both arms 113 are provided with turn buckle connections 117 but only one of these has been shown.

The structure of the scraper 99 is shown in Figure 2. The scraper beam is of angle iron as shown at 99a with one wall depending vertically. The scraper itself as shown at 99b is inclined forwardly and downwardly. Scraper blades are customarily secured to the scraper beams by means of bolts 99c but such ordinary connections dispose the scraper in a vertical plane. An efficient method for securing the desired inclination is to insert a rod 99d between the beam 99a and the blade 99b at a point beneath the bolts 99c. This rod may be held in place by means of U-shaped straps 99e for supporting the rod 99d, the straps 99e being clamped when the bolts are drawn tight.

The truck maintainer as above described will operate at a speed up to about fifteen miles per hour with no chatter because of the angle at which the blades are set, this being also the reason for the lightness of draft for the amount of work that it does.

The weight and the vibration of the truck are not communicated to the blades. The blades are not fastened directly to the truck but they are suspended on four cables which are long enough so that the oscillation of the truck does not affect the blades. The blades are pulled by two draft beams 42 from the truck frame. These beams govern the cutting of the blades since they are adjustable the same as with a walking plow to apply greater or less pressure. The blades are long and they do not drop into holes but they keep their position and thus shear off all bumps. They are so arranged that they carry the dirt and gravel across the road several times and thoroughly pulverize it, thus effectually filling up all holes. After the blades are once dropped on the road they require very little attention except in unusual situations such as when the road is muddy or when it becomes necessary to cross bridges or railroad crossings or the like.

The blades can be raised easily by means of hydraulic lifts operated by a pump in the cab of the truck. The rear jack 54 raises all of the blades at the same time and these blades may all be simultaneously lowered by releasing the pressure in the jack. The two front jacks are used only for adjusting the blades to the desired inclination with the road surface. If the side of the road is soft the jack on that side may be raised so as to relieve the pressure on the blades. When working on dirt shoulders along the side of pavement, the blades on one side may be raised over the pavement so as to bring the dirt up against it. When doing work of this kind, one end of the rear blade 99 must be raised over the pavement, this being easily done through a turn buckle 117. Either end of the blade 99 may be thus raised or both ends may be raised by turning the two turn buckles. The blade 99 may be set at any angle desired or it may be reversed.

The arrangement is such that the scraper frame may be removed from the truck independently of the supporting frame with the jacks. This is often desirable when it is desired to use the truck for other purposes.

By reversing one of the front blades and putting the front end of the blade in the center as shown in Figure 3, light snow may be taken off the highway at high speed. The snow will be delivered to one side, one round clearing twenty-four feet. If the road is narrow, both blades may be turned into the dotted line position in Figure 3 and the snow may then be pushed to both sides of the road clearing eleven and one-half feet. The truck maintainer may thus be used for clearing the snow off the road after a snow plow.

The extensions 89a on the two blades may be removed, leaving a width of eleven feet two inches, so that the maintainer may be taken into a garage having a twelve foot door. The scraper frame does not interfere when a rear tire of the truck must be removed. The use of the scraper and supporting frame does not necessitate the drilling of any holes in the truck or truck frame for the attachment of the maintainer.

Having thus described my invention in such full, clear, and exact terms that its construction and operation will be readily understood by others skilled in the art to which it pertains, what I claim as new and desire to secure by Letters Patent of the United States is:

1. A highway maintainer adapted to be supported on a truck frame, said maintainer including a supporting frame to rest on the truck frame and having means for releasable attachment thereto, a scraper frame suspended from and beneath said supporting frame with the center line of draft of said scraper frame in substantial alignment with the center line of draft of the truck frame, means for bodily raising or lowering said scraper frame, and means for adjustably altering the inclination of said scraper frame relative to the truck frame.

2. A highway maintainer adapted to be supported on a truck frame, said maintainer including a supporting frame to rest on the truck frame and having means for releasable attachment thereto, a rectangular scraper frame suspended from said supporting frame, and a jack supported by said supporting frame and having flexible connections to the four corners of the scraper frame for bodily elevating said scraper frame.

3. A highway maintainer adapted to be supported on a truck frame, said maintainer including a supporting frame to rest on the truck frame and having means for releasable attachment thereto, a rectangular scraper frame suspended from said supporting frame, a jack supported by said supporting frame and having flexible connections to the four corners of said scraper frame for bodily elevating said scraper frame, and a pair of jacks at the forward corners of said supporting frame and having connections to the forward corners of said scraper frame, said forward jacks being adapted for individual actuation.

4. A highway maintainer including a scraper frame, a pair of rearwardly converging scrapers in the forward portion of said scraper frame, a pair of rearwardly diverging scrapers in the rear portion of said scraper frame, a draw bar secured to said scraper frame and projecting rearwardly therefrom, and a transporting scraper secured to said draw bar.

5. A highway maintainer including a scraper frame, a pair of rearwardly converging scrapers in the forward portion of said scraper frame, said scrapers being adjustable into rearwardly diverging position or into substantial parallelism with both scrapers inclined in a rearward direction and toward either side of said maintainer, a pair of rearwardly diverging scrapers in the rear portion of said scraper frame, a draw bar secured to said scraper frame and projecting rearwardly therefrom, and a transporting scraper secured to said draw bar.

6. A highway maintainer including a scraper frame, a pair of rearwardly converging scrapers adjustably secured in the forward portion of said scraper frame, a pair of rearwardly diverging scrapers fixedly secured in the rear portion of said scraper frame, the scrapers of each of said pairs of scrapers being of substantially equal length for eliminating side draft in said scraper frame, and means associated with said pair of rearwardly diverging scrapers for resisting side thrusts.

7. A highway maintainer including a scraper frame carrying a front scraper and a rear scraper, said scrapers being each symmetrical about the center line of draft of said maintainer, means associated with said rear scraper for resisting side thrusts, a transporting scraper secured to said scraper frame in the rear of said rear scraper, and means associated with said rear scraper for resisting the side draft thereof, said means including two pairs of runners and connections between said runners and said inclined scraper, said connections being rigid against relative movement in a horizontal plane.

8. In combination, a scraper frame having scrapers secured thereto, said scrapers being symmetrical about the longitudinal axis of said scraper frame, a draw bar secured to said scraper frame to project rearwardly therefrom in the projected longitudinal axis of said scraper frame, a soil transporting scraper secured to said draw bar for adjustable pivotal movement in a horizontal plane, and means for latching said transporting scraper in any desired position of adjustment, said transporting scraper including an angle iron beam with one portion in vertical position and a blade secured to said beam with its upper edge in contact with said beam and diverging therefrom in a forward and downward direction.

9. In combination, a scraper frame having scrapers secured thereto, said scrapers being symmetrical about the longitudinal axis of said scraper frame, a draw bar pivotally secured to said scraper frame to project rearwardly therefrom in the projected longitudinal axis thereof for movement in the vertical plane of the longitudinal axis of said scraper frame, a soil transporting scraper secured to said draw bar for adjustable pivotal movement in a horizontal plane, means for latching said transporting scraper in any desired position of adjustment, a presser arm exerting a downward thrust on said draw bar, said arm being downwardly and rearwardly inclined, and yieldable means for urging the lower extremity of said arm toward movement in a forward direction.

10. In combination a scraper frame having scrapers secured thereto, said scrapers being symmetrical about the longitudinal axis of said scraper frame, a draw bar pivotally secured to said scraper frame to project rearwardly therefrom in the projected longitudinal axis thereof for movement in the vertical plane of the longitudinal axis of said scraper frame, a soil transporting scraper secured to said draw bar for adjustable pivotal movement in a horizontal plane, means for latching said transporting scraper in any desired position of adjustment, a standard adjacent said draw bar, a downwardly and rearwardly inclined presser member pivotally secured to said standard and resting at its lower extremity on said draw bar, and a tension spring secured to and extending forwardly from the lower extremity of said presser member.

11. In combination, a scraper frame having scrapers secured thereto, said scrapers being symmetrical about the longitudinal axis of said scraper frame, a draw bar pivotally secured to said scraper frame to project rearwardly therefrom in the projected longitudinal axis thereof for movement in the vertical plane of the longitudinal axis of said scraper frame, a soil transporting scraper secured to said draw bar for adjustable pivotal movement in a horizontal plane, means for latching said transporting scraper in any desired position of adjustment, an intermediate portion of said draw bar being upwardly curved, a standard adjacent said draw bar, a downwardly and rearwardly inclined presser member pivotally secured to said standard and resting at its lower extremity on said draw bar immediately forward of the curved portion thereof, and a tension spring secured to and extending forwardly from the lower extremity of said presser member.

12. In combination, a scraper frame having scrapers secured thereto, said scrapers being symmetrical about the longitudinal axis of said scraper frame, a draw bar pivotally secured to said scraper frame to project rearwardly therefrom in the projected longitudinal axis thereof for movement in the vertical plane of the longitudinal axis of said scraper frame, a soil transporting scraper secured to said draw bar for adjustable pivotal movement in a horizontal plane, a pair of pivoted arms projecting rearwardly in parallelism with said draw bar and on opposite sides thereof, adjustable connections between said transporting scraper and said arms, means for latching said transporting scraper in any desired position of adjustment, and a yieldable presser member for exerting a downward thrust on said draw bar.

13. In combination, a scraper frame having scrapers secured thereto, a draw bar pivotally secured to said scraper frame to project rearwardly therefrom for movement in a vertical plane, a soil transporting scraper having an axial connection with said draw bar for adjustable movement in a horizontal plane, a pair of arms pivotally secured to said scraper frame and positioned on opposite sides of said draw bar and in substantial parallelism therewith, upstanding forks axially secured to said transporting scraper and in alignment with said arm and adapted to receive said arms, and means for securing said arms to said forks in any desired position of adjustment of said transporting scraper.

14. In combination, a scraper frame having scrapers secured thereto, a draw bar secured to said scraper frame to project rearwardly therefrom for movement in a vertical plane, a soil transporting scraper secured to said draw bar, a pair of arms projecting rearwardly from said scraper frame and positioned in substantial parallelism with said draw bar and on opposite sides thereof, said arms being secured to said transporting scraper, a pair of rearwardly and upwardly inclined arms adjustably secured to said scraper frame to project above said first named arms, and adjustable connections between said first named arms and said rearwardly and upwardly inclined arms.

In testimony whereof I affix my signature.
CARL O. JOHNSON.